(12) United States Patent
Hamabe

(10) Patent No.: US 6,879,831 B2
(45) Date of Patent: Apr. 12, 2005

(54) MOBILE COMMUNICATION SYSTEM, MOBILE TERMINAL, AND TRANSMISSION DIVERSITY APPLICATION METHOD USED THEREFOR

(75) Inventor: Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 619 days.

(21) Appl. No.: 10/067,409

(22) Filed: Feb. 7, 2002

(65) Prior Publication Data

US 2002/0115440 A1 Aug. 22, 2002

(30) Foreign Application Priority Data

Feb. 20, 2001 (JP) ........................................ 2001-043120

(51) Int. Cl.⁷ ................................................. H04Q 7/20
(52) U.S. Cl. ........................ 455/442; 455/436; 455/437; 455/439
(58) Field of Search ................................. 455/442, 436, 455/437, 438, 439, 440, 450, 522

(56) References Cited

U.S. PATENT DOCUMENTS 6,324,401 B1 * 11/2001 De Hoz Garcia-Bellido et al. ........................... 455/442
2002/0009061 A1 * 1/2002 Willenegger ................. 455/522
2002/0115460 A1 * 8/2002 Rune et al. ................... 455/522
2002/0160781 A1 * 10/2002 Bark et al. .................... 455/450
2002/0164986 A1 * 11/2002 Briand et al. ................. 455/442
2003/0069020 A1 * 4/2003 Speight ....................... 455/450
2004/0087327 A1 * 5/2004 Guo ............................ 455/522

* cited by examiner

Primary Examiner—David Hudspeth
Assistant Examiner—Huy Nguyen
(74) Attorney, Agent, or Firm—Sughrue Mion, PLLC (57) ABSTRACT

A mobile terminal is capable of efficiently performing transmission diversity of a PDSCH and a DPCH without increasing the number of bits of control information to be fed back to a base station and rendering a feedback period longer. A feedback information generating portion determines transmission diversity control information on the PDSCH in response to a switching instruction from a control portion, when receiving first PDSCH data during soft handover, based on a receiving state of a signal of a cell for sending the PDSCH data. In addition, when receiving the last PDSCH data during the soft handover, the feedback information generating portion determines the transmission diversity control information on the DPCH in response to the switching instruction from the control portion based on the receiving state after synthesis of the signal of the cell of an active set.

27 Claims, 11 Drawing Sheets

| PDSCH | MOBILE STATION | FEEDBACK INFORMATION |
|---|---|---|
| WAITING FOR DATA RECEPTION | DPCH #1, RECEIVING DPCH #2 | CPICH #1 + CPICH #2 |
| DURING DATA RECEPTION | DPCH #1, DPCH #2, RECEIVING PDSCH | CPICH #1 |

FIG. 4A

UP: DEDICATED PILOT | FBI | TPC

FIG. 4B

DOWN: DATA 1 | TPC | CONTROL INFORMATION | DATA 2 | DEDICATED PILOT

FIG. 5A

WAITING FOR RECEPTION OF PDSCH

FIG. 5B

DURING RECEPTION OF PDSCH

MOBILE COMMUNICATION SYSTEM, MOBILE TERMINAL, AND TRANSMISSION DIVERSITY APPLICATION METHOD USED THEREFOR

BACKGROUND OF THE INVENTION

1. Field of the Invention

The present invention relates to a mobile communication system, a mobile terminal and a transmission diversity application method used therefor, and in particular, to a system for applying closed-loop type transmission diversity to both a PDSCH (Physical Downlink Shared Channel) and a DPCH (Dedicated Physical Channel).

2. Description of the Prior Art

In recent years, mobile terminals (mobile stations) such as portable telephones are increasingly rendered multimedia-capable for the purpose of handling a large-capacity static image, short-time animation and so on so that a large-capacity and high-speed data transmission method is required along with it.

As for this large-capacity and high-speed data transmission method, a PDSCH method, an HS-PDSCH (High Speed-Physical Downlink Shared Channel) method and so on wherein only a downward (a direction from a base station to a mobile station) transmission speed is accelerated are proposed.

As for a system using the PDSCH method, there is a system wherein a DPCH is sent from the base station to a large number of mobile stations in a standby status waiting for reception of PDSCH data, and the PDSCH and DPCH are sent from the base station to the mobile station just receiving the PDSCH data.

In the case of applying closed-loop type transmission diversity to both the PDSCH and DPCH in this system, the mobile station determines a transmission diversity control information on the DPCH based on receiving quality of a CPICH (Common Pilot Channel) or the DPCH after diversity synthesis, and determines the transmission diversity control information on the PDSCH based on the receiving quality of the CPICH or the DPCH of the base station sending the PDSCH. After that, the mobile station notifies the base station of both the transmission diversity control information on the DPCH and transmission diversity control information on the PDSCH.

Moreover, when switching of the base station to another base station is performed by soft handover in the case where the mobile station moves from a cell in a control range of a certain base station to the cell of another base station in this system, the control information to be fed back to the base station for the transmission diversity is different between the PDSCH and the DPCH.

Figure 12:
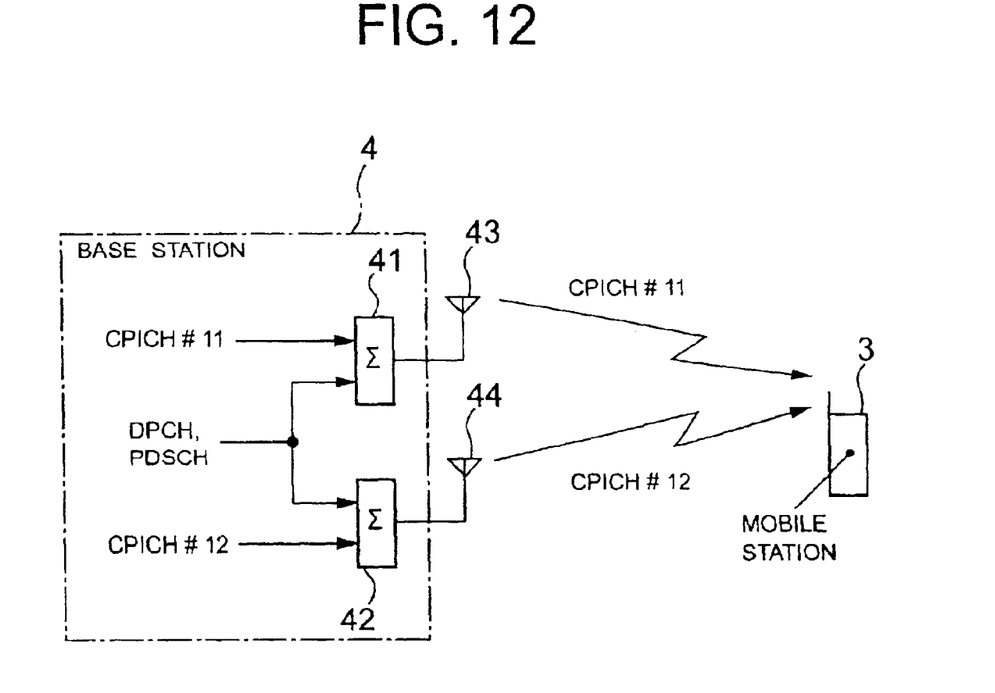
FIG. 12 is a diagram showing transmission diversity control in the past.

Here, operation of the transmission diversity is shown FIG. 12. In the case of performing this transmission diversity, CPICHs #11, #12, the DPCH and the PDSCH are synthesized in synthesis portions 41 and 42 of a base station 4 respectively and sent to a mobile station 3 from antennas 43 and 44.

The mobile station 3 detects a phase difference of the CPICHs #11 and #12 and feeds back information on the phase difference thereof to the base station 4 as the transmission diversity control information. The base station 4 controls the transmission based on the control information that is fed back so that a receiving state at said mobile station 3 becomes the best.

As for the above-mentioned system of the past using the PDSCH method, it requires different control information between the PDSCH and the DPCH during the soft handover in the case of applying closed-loop type transmission diversity to both the PDSCH and DPCH, and so the respective control information on the PDSCH and the DPCH is fed back to the base station, resulting in an increased number of bits of the control information to the base station.

In addition, as the respective control information on the PDSCH and the DPCH is separately sent to the base station if the number of bits of the control information to the base station is fixed, it is necessary to render a feedback period longer, so that characteristics in a relatively high-speed fading environment deteriorate and circuit capacity decreases.

BRIEF SUMMARY OF THE INVENTION

Thus, an object of the present invention is to provide the mobile communication system, the mobile terminal and the transmission diversity application method used therefor and its program capable of solving the above problems and efficiently performing the transmission diversity of the PDSCH and the DPCH without increasing the number of bits of the control information to be fed back to the base station and rendering the feedback period longer.

A mobile communication system according to the present invention is one wherein a process of switching a base station to accommodate a mobile station to another base station is performed by soft handover and, based on transmission diversity control information fed back from the above described mobile station, the above described base station controls the above described transmission diversity so that a receiving state at the above described mobile station becomes the best, the above described system having:

a first determination means of, during the above described soft handover, determining the above described transmission diversity control information during reception of data by a PDSCH (Physical Downlink Shared Channel) based on the receiving state of a signal from the base station sending the above described PDSCH; and a second determination means of, during the above described soft handover, determining the above described transmission diversity control information during standby waiting for reception of the data by the above described PDSCH based on the receiving state after synthesis of the signal from each subject base station of the above described soft handover.

A mobile terminal according to the present invention is one of the system wherein the process of switching the base station to accommodate its terminal to another base station is performed by the soft handover and, based on the transmission diversity control information fed back by the above described base station so that the receiving state at its terminal becomes the best, the above described transmission diversity is controlled, the above described mobile terminal having:

a first determination function of, during the above described soft handover, determining the above described transmission diversity control information during reception of data by the PDSCH (Physical Downlink Shared Channel) based on the receiving state of the signal from the base station sending the above described PDSCH; and a second determination function of, during the above described soft handover, determining the above described transmission diversity control information during the standby waiting for the reception of the data by the above described PDSCH based on the receiving state after the synthesis of the signal from each subject base station of the above described soft handover.

A transmission diversity application method according to the present invention is one of the mobile communication system wherein the process of switching the base station to accommodate the mobile station to another base station is performed by soft handover and, based on transmission diversity control information fed back from the above described mobile station, the above described base station controls the above described transmission diversity so that the receiving state at the above described mobile station becomes the best, the above described method having:

a first step of, during the above described soft handover, giving an instruction to switch to the first determination means of determining the above described transmission diversity control information during the reception of the data by the PDSCH (Physical Downlink Shared Channel) based on the receiving state of the signal from the base station sending the above described PDSCH; and a second step of, during the above described soft handover, giving an instruction to switch to a second determination means of determining the above described transmission diversity control information during the standby waiting for the reception of the data by the above described PDSCH based on the receiving state after the synthesis of the signal from each subject base station of the above described soft handover.

A program of the transmission diversity application method according to the present invention is one of the mobile communication system wherein the process of switching the base station to accommodate the mobile station to another base station is performed by the soft handover and, based on the transmission diversity control information fed back from the above described mobile station, the above described base station controls the above described transmission diversity so that the receiving state at the above described mobile station becomes the best, the above described program having a computer implement the processes of:

during the above described soft handover, giving an instruction to switch to the first determination means of determining the above described transmission diversity control information during reception of data by the PDSCH (Physical Downlink Shared Channel) based on the receiving state of the signal from the base station sending the above described PDSCH; and during the above described soft handover, giving an instruction to switch to the second determination means of determining the above described transmission diversity control information during the standby waiting for the reception of the data by the above described PDSCH based on the receiving state after the synthesis of the signal from each subject base station of the above described soft handover.

To be more specific, in the soft handover for performing the process of switching the base station to accommodate the mobile station to another base station, the mobile communication system of the present invention has the transmission diversity control information fed back to the base station determined by the mobile station just receiving the PDSCH data based on the receiving state of the signal of a cell [normally CPICH (Common Pilot Channel) #1] for sending the PDSCH (Physical Downlink Shared Channel).

On the other hand, a large number of mobile stations in a standby status waiting for reception of the PDSCH data determine the transmission diversity control information on the DPCH (Dedicated Physical Channel) fed back to the base station based on the receiving state after the synthesis of the signal of the cell of an active set (normally CPICH#1, CPICH#2).

In this case, receiving SIR (Signal to Interference Ratio) or Ec/Io (energy per chip/interference wave power per unit frequency) is normally used as the receiving state.

It becomes possible thereby to efficiently perform the transmission diversity of the PDSCH and the DPCH without increasing the number of bits of the control information to be fed back to the base station and rendering the feedback period longer. Moreover, it is also possible to apply the above process to the system performing fast cell selection (FCS).

DETAILED DESCRIPTION OF THE PREFERRED EMBODIMENTS

Figure 1:
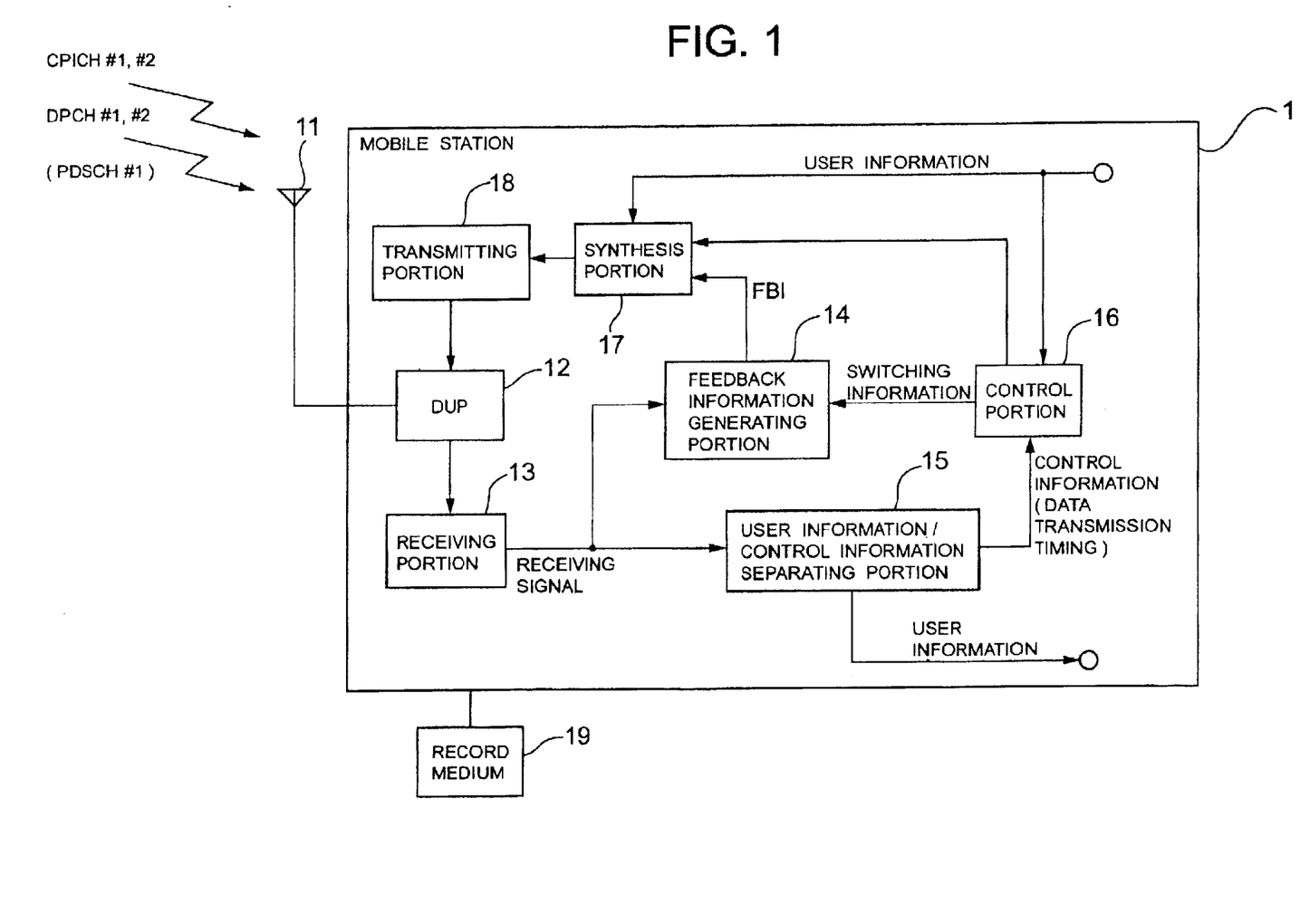
FIG. 1 is a block diagram showing a configuration of a mobile station according to an embodiment of the present invention.

Next, the embodiments of the present invention will be described by referring to the drawings. FIG. 1 is a block diagram showing a configuration of a mobile station according to an embodiment of the present invention. In FIG. 1, a mobile station (mobile terminal) 1 includes an antenna 11, a duplexer (DUP) 12, a receiving portion 13, a feedback information generating portion 14, a user information/control information separating portion 15, a control portion 16, a synthesis portion 17, a transmitting portion 18 and a record medium 19. Since, as technologies in the public domain are applicable to a call control portion, a voice input output portion and a display portion of the mobile station 1, description of their configurations and operations will be omitted.

The receiving portion 13 sends signals {CPICH (Common Pilot Channel) #1, CPICH #2, DPCH (Dedicated Physical Channel) #1, DPCH #2, PDSCH (Physical Downlink Shared Channel)} received via the antenna 11 and the duplexer 12 to the feedback information generating portion 14 and the user information/control information separating portion 15, respectively.

The feedback information generating portion 14 generates feedback information (FBI), which should be sent to a base station not shown, based on a receiving signal from the receiving portion 13 according to a switching instruction from the control portion 16, and suplies the feedback information to the synthesis portion 17.

To be more specific, during soft handover for performing the process of switching the base station to accommodate the mobile station 1 to another base station, the feedback information generating portion 14 determines, based on a receiving state of a signal (normally CPICH #1) of a cell for transmitting the PDSCH data, transmission diversity control information on the PDSCH in response to the switching instruction from the control portion 16 on receiving first PDSCH data (during reception of the PDSCH data), and sends the determined information as the feedback information to the synthesis portion 17.

In addition, during the soft handover, the feedback information generating portion 14 determines, based on the receiving state after synthesis of the signal (normally CPICH #1, CPICH #2) of the cell of an active set, the transmission diversity control information on the DPCH in response to the switching instruction from the control portion 16 on receiving the last PDSCH data (waiting for reception of the PDSCH data), and sends the determined information as the feedback information to the synthesis portion 17.

In this case, receiving SIR (Signal to Interference Ratio) or Ec/Io (energy per chip/interference wave power per unit frequency) is normally used as the receiving state.

The user information/control information separating portion 15 separates the receiving signal from the receiving portion 13 into the user information (sound signals, image signals and so on) and the control information, and sends the user information to the call control portion, the voice output portion and the display portion of the above-mentioned mobile station 1 and sends the control information to the control portion 16.

The control portion 16 generates various control signals, by executing a program stored in the record medium 19, based on the control information from the user information/control information separating portion 15 and input information (such as pressing information of ten keys and so on) from the outside so as to output them to the portions in the mobile station 1 and exercise control. The record medium 19 stores the programs executed by the portions including the control portion 16 in the mobile station 1.

In addition, in the case where the control information is in timing for sending the PDSCH data, the control portion 16 sends the switching instruction during the reception of the PDSCH data to the feedback information generating portion 14, and in the case of the information indicating the last PDSCH data or in the case of having received all the PDSCH data to be received, it sends the switching instruction of a state of waiting for the reception of the PDSCH data to the feedback information generating portion 14. On receipt of this PDSCH data, the control portion 16 generates an acknowledgement (ACK) on receipt of this PDSCH data and sends it to the synthesis portion 17.

The synthesis portion 17 synthesizes the input signals from the outside such as the feedback information from the feedback information generating portion 14, the acknowledgement on receipt of the PDSCH data from the control portion 16 and the call control portion and the voice input portion of the mobile station 1, and transmits them as DPCH #1 (UL: up link) and DPCH #2 (UL) from the antenna 11 via the sending portion 18 and the duplexer 12.

Figure 2:
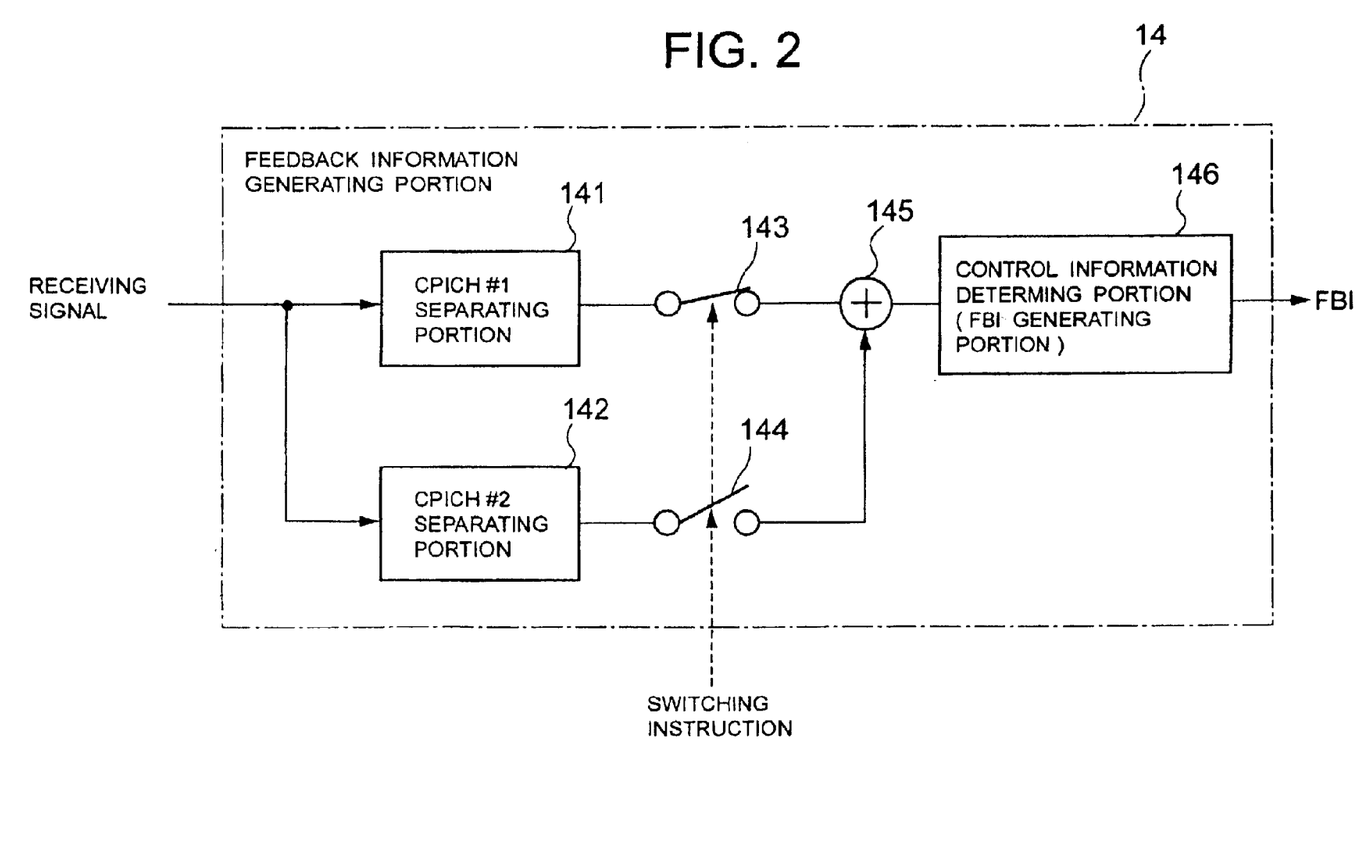
FIG. 2 is a block diagram showing the configuration of a feedback information generating portion in FIG. 1.

FIG. 2 is a block diagram showing a configuration of the feedback information generating portion 14. In FIG. 2, the feedback information generating portion 14 comprises a CPICH #1 separating portion 141, a CPICH #2 separating portion 142, switches 143 and 144, an adder 145 and a control information determining portion (FBI generating portion) 146.

The CPICH #1 separating portion 141 separates a CPICH #1 from the receiving signal of the receiving portion 13 and outputs it to the switch 143. The CPICH #2 separating portion 142 separates a CPICH #2 from the receiving signal of the receiving portion 13 and outputs it to the switch 144.

The switches 143 and 144 are turned on and off in response to a switching signal from the control portion 16, and in the case where they are on, they connect the CPICH #1 separating portion 141 and the CPICH #2 separating portion 142 to the adder 145, respectively. Here, the switching signal from the control portion 16 gives an instruction to turn on the switch 143 and turn off the switch 144 during the reception of the PDSCH data, and gives an instruction to turn on both the switch 143 and switch 144 when in the state of waiting for the reception of the PDSCH data.

The adder 145 adds the CPICH #1 separated by the CPICH #1 separating portion 141 and the CPICH #2 separated by the CPICH #2 separating portion 142 inputted via the switches 143 and 144, and sends the adding result to the control information determining portion 146. During the reception of the PDSCH data, however, it sends the CPICH #1 separated by the CPICH #1 separating portion 141 as-is to the control information determining portion 146 since the switch 144 is off.

The control information determining portion 146 determines the transmission diversity control information based on the adding result of the adder 145. To be more specific, on receiving the first PDSCH data during the soft handover (during the reception of the PDSCH data), the control information determining portion 146 determines the PDSCH transmission diversity control information based on the receiving state of the CPICH #1 that is the signal of the cell sending the PDSCH data, and applies the determined information to the synthesis portion 17 as the feedback information.

In addition, on receiving the last PDSCH data during the soft handover (the state of waiting for the PDSCH data), the control information determining portion 146 determines the DPCH transmission diversity control information based on the receiving state after the synthesis of the CPICH #1 and the CPICH #2 that are the signals of the cells of the active set, and applies the determined information to the synthesis portion 17 as the feedback information. Incidentally, receiving SIR or Ec/Io is normally used as the receiving state.

Figure 3:
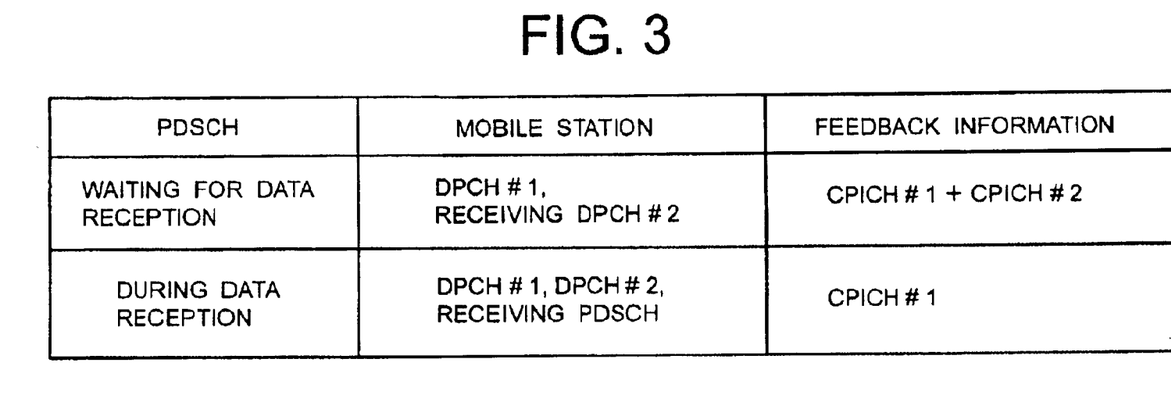
FIG. 3 is a diagram showing switching of feedback information in a mobile communication system according to an embodiment of the present invention.

FIG. 3 is a diagram showing an example of the switching of the feedback information in the mobile communication system according to an embodiment of the present invention. In the mobile communication system according to an embodiment of the present invention in FIG. 3, in the case of waiting for the reception of the PDSCH data, the mobile station 1 receives the DPCH #1 (DL: down link) and DPCH #2 (DL), and the DPCH transmission diversity control information based on the receiving state of the "CPICH #1+the CPICH #2" is transmitted to the base station as the feedback information of the mobile station 1. By this, the base station controls the transmission so that the receiving state at the mobile station 1 becomes the best based on this transmission diversity control information.

Moreover, in the mobile communication system according to an embodiment of the present invention, in the case of just receiving the PDSCH data, the mobile station 1 receives the DPCH #1 (DL), DPCH #2 (DL) and the PDSCH, and the PDSCH transmission diversity control information based on the receiving state of the "CPICH #1" is transmitted to the base station as the feedback information of the mobile station 1. By this, the base station controls the transmission so that the receiving state at the mobile station 1 becomes the best based on such transmission diversity control information.

Figure 4A:
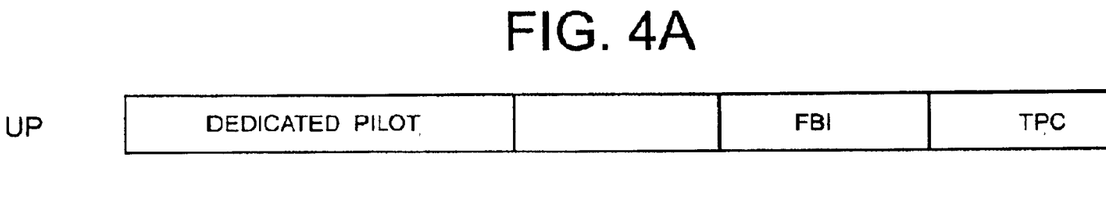
FIG. 4A is a diagram showing a format of an upward DPCH according to an embodiment of the present invention.
Figure 4B:
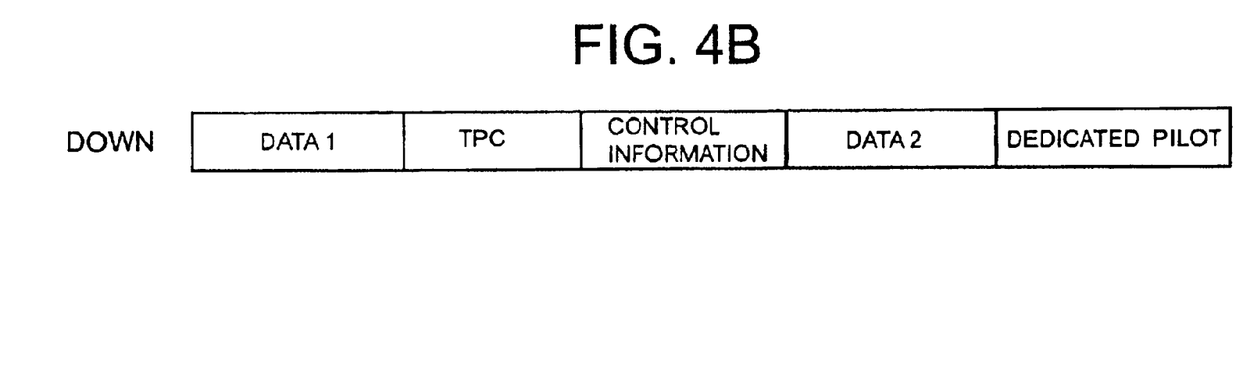
FIG. 4B is a diagram showing a format of a downward DPCH according to an embodiment of the present invention.

FIG. 4A is a diagram showing a format of an upward DPCH according to an embodiment of the present invention, and FIG. 4B is a diagram showing a format of a downward DPCH according to an embodiment of the present invention.

In FIG. 4A, the upward DPCH is comprised of a discrete pilot (predetermined bit sequence), the feedback information (FBI) and a TPC (Transmission Power Control) bit.

In FIG. 4B, the downward DPCH is comprised of data 1, the TPC bit, the control information (PDSCH data transmission timing), data 2 and the discrete pilot (predetermined bit sequence).

Figure 5A:
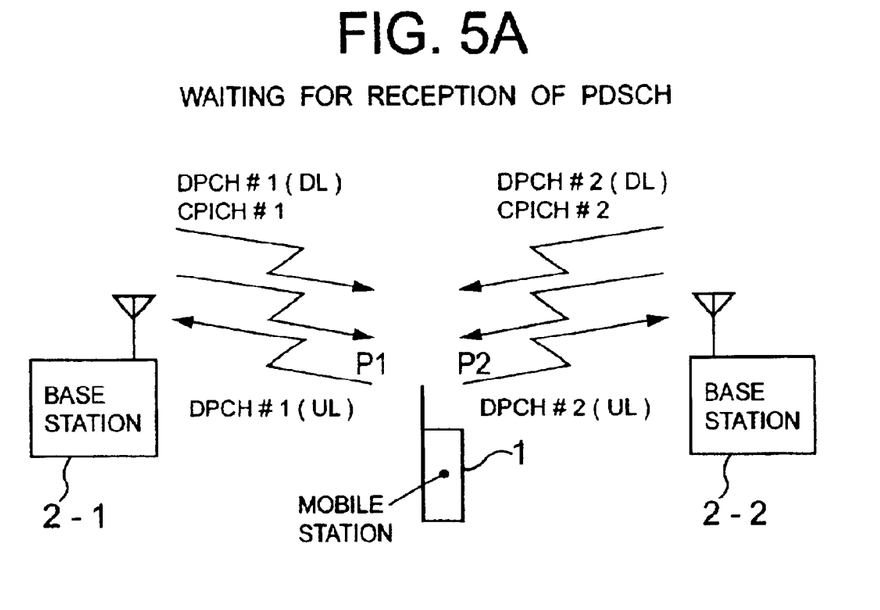
FIG. 5A is a diagram showing a state of waiting for reception of a PDSCH in the mobile communication system according to an embodiment of the present invention.
Figure 5B:
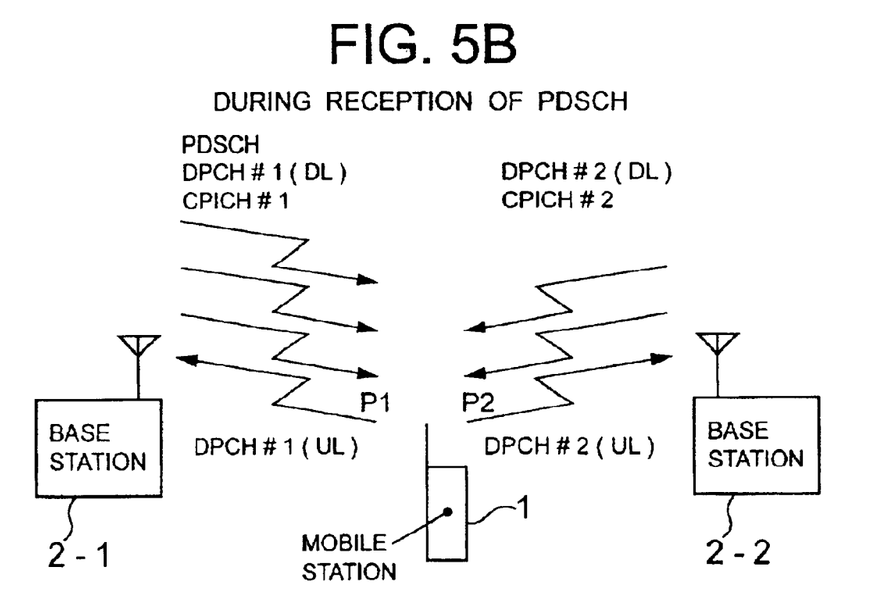
FIG. 5B is a diagram showing a state of just receiving the PDSCH in the mobile communication system according to an embodiment of the present invention.

FIG. 5A is a diagram showing the state of waiting for the reception of the PDSCH in the mobile communication system according to an embodiment of the present invention, and FIG. 5B is a diagram showing the state of just receiving the PDSCH in the mobile communication system according to an embodiment of the present invention.

In the mobile communication system according to an embodiment of the present invention, in the case of waiting for the reception of the PDSCH data, the mobile station 1 receives the "CPICH #1, CPICH #2, DPCH #1 (DL) and DPCH #2 (DL) from the base stations 2-1 and 2-2, and the DPCH transmission diversity control information based on the receiving state of the "CPICH #1+CPICH #2" is transmitted by the DPCH #1 (UL) and DPCH #2 (UL) to the base stations 2-1 and 2-2 as the feedback information of the mobile station 1, respectively (see FIG. 5A).

In addition, in the mobile communication system according to an embodiment of the present invention, in the case of just receiving the PDSCH data, the mobile station 1 receives the CPICH #1, DPCH #1 (DL) and PDSCH from the base station 2-1, and also receives the CPICH #2 and DPCH #2 (DL) from the base station 2-2.

Thus, as the feedback information of the mobile station 1, the PDSCH transmission diversity control information based on the receiving state of the "CPICH #1" is transmitted to the base station 2-1 by the DPCH #1 (UL) (see FIG. 5B). Accordingly, the base stations 2-1 and 2-2 control the transmission so that the receiving state at the mobile station 1 becomes the best based on such transmission diversity control information.

Figure 6:
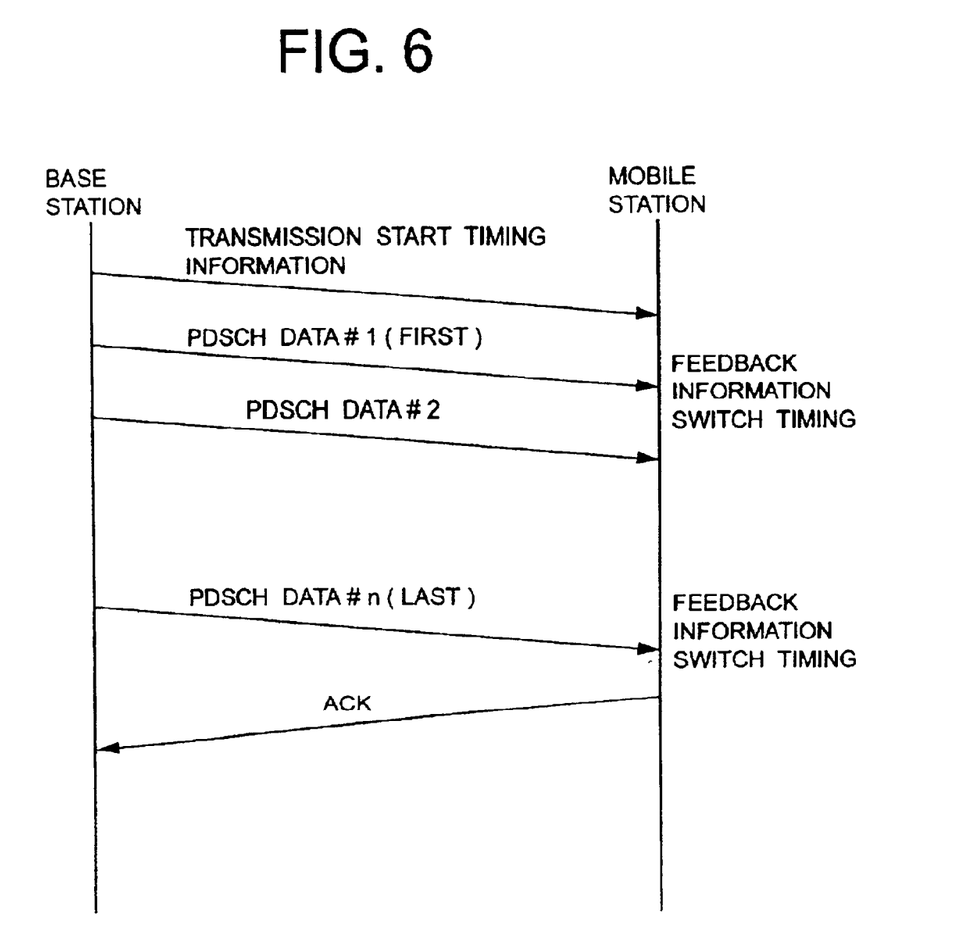
FIG. 6 is a sequence chart showing operation of the mobile communication system according to an embodiment of the present invention.
Figure 7:
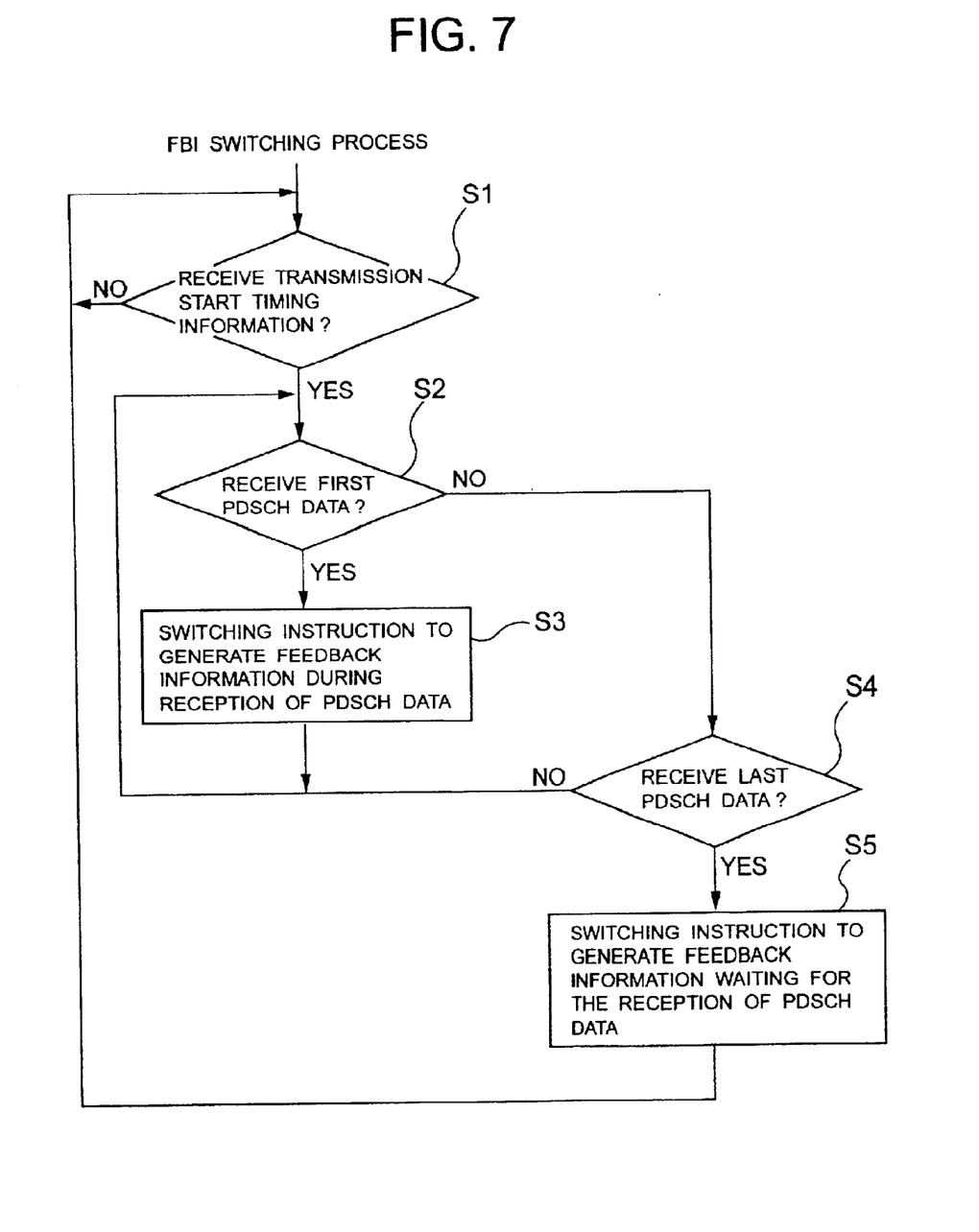
FIG. 7 is a flowchart showing the operation of the mobile station 1 in FIG. 1.

FIG. 6 is a sequence chart showing the operation of the mobile communication system according to an embodiment of the present invention, and FIG. 7 is a flowchart showing the operation of the mobile station 1 in FIG. 1. The operation of the mobile communication system according to an embodiment of the present invention will be described by referring to FIGS. 1 to 7. The processing operation shown in FIG. 7 is implemented by the control portion 16 executing the program stored in the record medium 19.

Here, while the mobile station 1 and the base stations 2-1 will be described hereafter in order to simplify the description, it is assumed that the base stations 2-1 and 2-2 are in the soft handover due to movement of the mobile station 1.

First, in the case of transmitting the PDSCH data according to a request from the mobile station 1, the base station 2-1 notifies the mobile station 1 of transmission start timing information by the DPCH #1 (DL) before transmitting the PDSCH data.

On receiving the transmission start timing information from the base station 2-1 (FIG. 7 step S1), the control portion 16 of the mobile station 1 shifts to the state of receiving the PDSCH data, and on receiving the first PDSCH data (FIG. 7 step S2), it outputs to the feedback information generating portion 14 a switching instruction to generate the feedback information during the reception of the above-mentioned PDSCH data (FIG. 7 step S3).

The control portion 16 sequentially receives the PDSCH data from the base station 2-1, and on receiving the last PDSCH data (FIG. 7 step S4), it outputs to the feedback information generating portion 14 the switching instruction to generate the feedback information in the state of waiting for the reception of the above-mentioned PDSCH data (FIG. 7 step S5). Hereafter, the control portion 16 transmits the acknowledgement (ACK) for the PDSCH data to the base station 2-1.

Here, as a method for the control portion 16 to identify the last PDSCH data, it may identify it by the information (a flag) given to the last PDSCH data indicating that it is the last one, or it may have the size of the PDSCH data to be sent notified in advance from the base station 2-1 to the mobile station 1 so as to identify it by the size thereof. In addition, it is also possible to identify the last PDSCH data by a method other than this.

Figure 8:
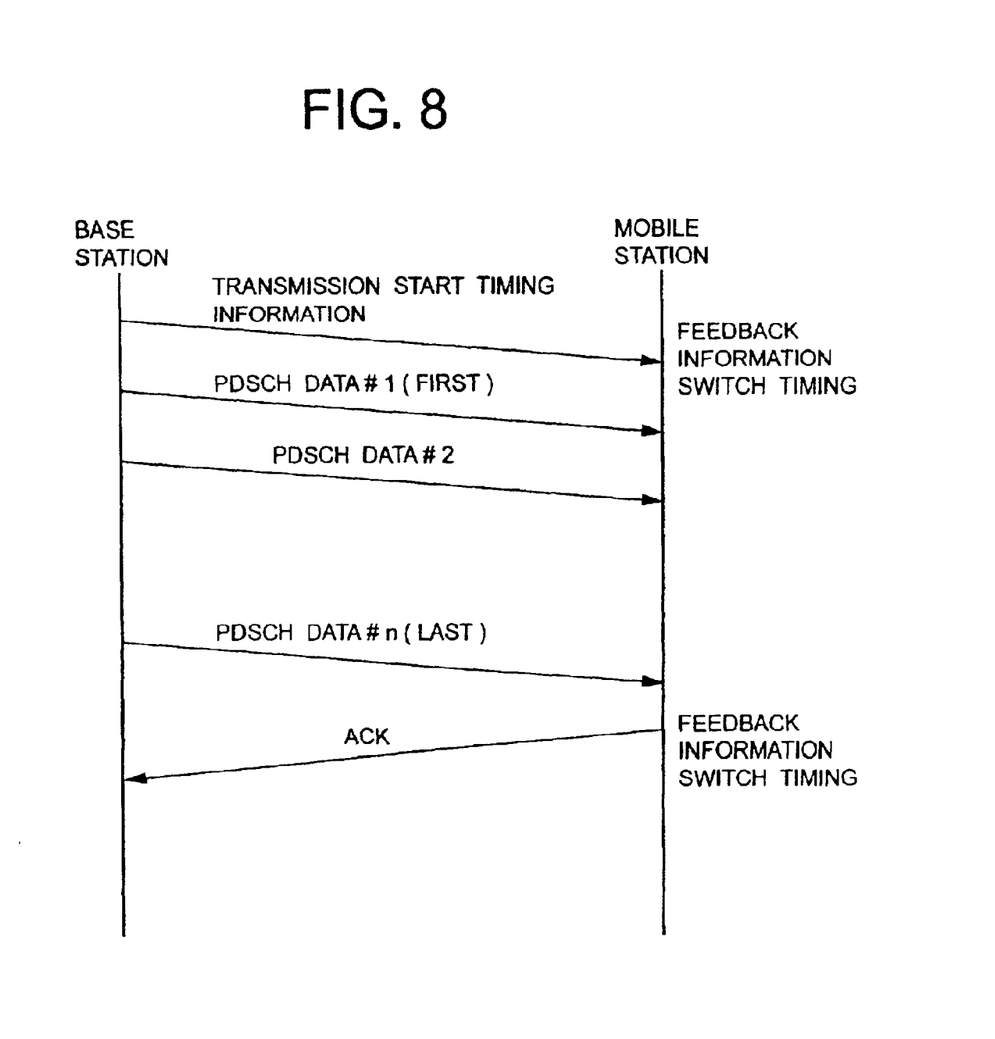
FIG. 8 is a sequence chart showing the operation of the mobile communication system according to another embodiment of the present invention.
Figure 9:
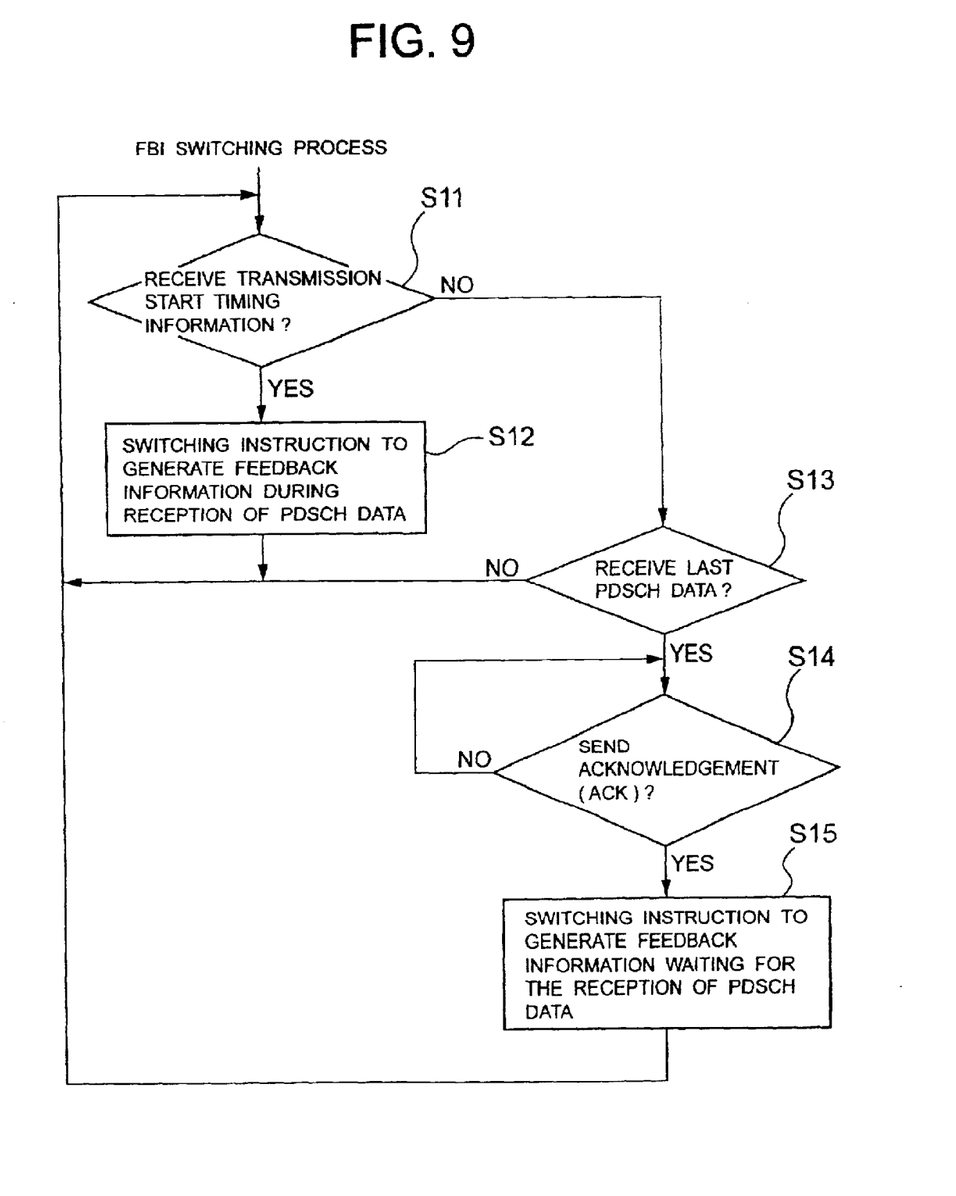
FIG. 9 is a flowchart showing the operation of the mobile station according to the other embodiment of the present invention.

FIG. 8 is a sequence chart showing the operation of the mobile communication system according to another embodiment of the present invention, and FIG. 9 is a flowchart showing the operation of the mobile station according to the other embodiment of the present invention. As the other embodiment of the present invention has the same configuration of the mobile station as the embodiment shown in FIG. 1, the operation of the mobile communication system according to the other embodiment will be described by referring to FIGS. 1, 8 and 9. The processing operation shown in FIG. 9 is implemented by the control portion 16 executing the program stored in the record medium 19.

Here, while the mobile station 1 and the base stations 2-1 will be described hereafter, it is assumed, in order to simplify the description, that the base stations 2-1 and 2-2 are in the soft handover due to movement of the mobile station 1.

First, in the case of transmitting the PDSCH data according to the request from the mobile station 1, the base station 2-1 notifies the mobile station 1 of the transmission start timing information by the DPCH #1 (DL) before sending the PDSCH data.

On receiving the transmission start timing information from the base station 2-1 (FIG. 9 step S11), the control portion 16 of the mobile station 1 outputs to the feedback information generating portion 14 the switching instruction to generate the feedback information during the reception of the above-mentioned PDSCH data (FIG. 9 step S12). Hereafter, the control portion 16 shifts to the state of accepting the PDSCH data and sequentially receives the PDSCH data.

The control portion 16 sequentially receives the PDSCH data from the base station 2-1, and on receiving the last PDSCH data (FIG. 9 step S13) and transmitting the acknowledgement (ACK) for the PDSCH data to the base station 2-1 (FIG. 9 step S14), it outputs to the feedback information generating portion 14 the switching instruction to generate the feedback information in the state of waiting for the reception of the above-mentioned PDSCH data (FIG. 9 step S15).

Here as the method for the control portion 16 to identify the last PDSCH data, it may identify it by the information (the flag) given to the last PDSCH data indicating that it is the last one, or it may have the size of the PDSCH data to be sent notified in advance from the base station 2-1 to the mobile station 1 so as to identify it by the size thereof. In addition, it is possible to identify the last PDSCH data by a method other than this.

Figure 10:
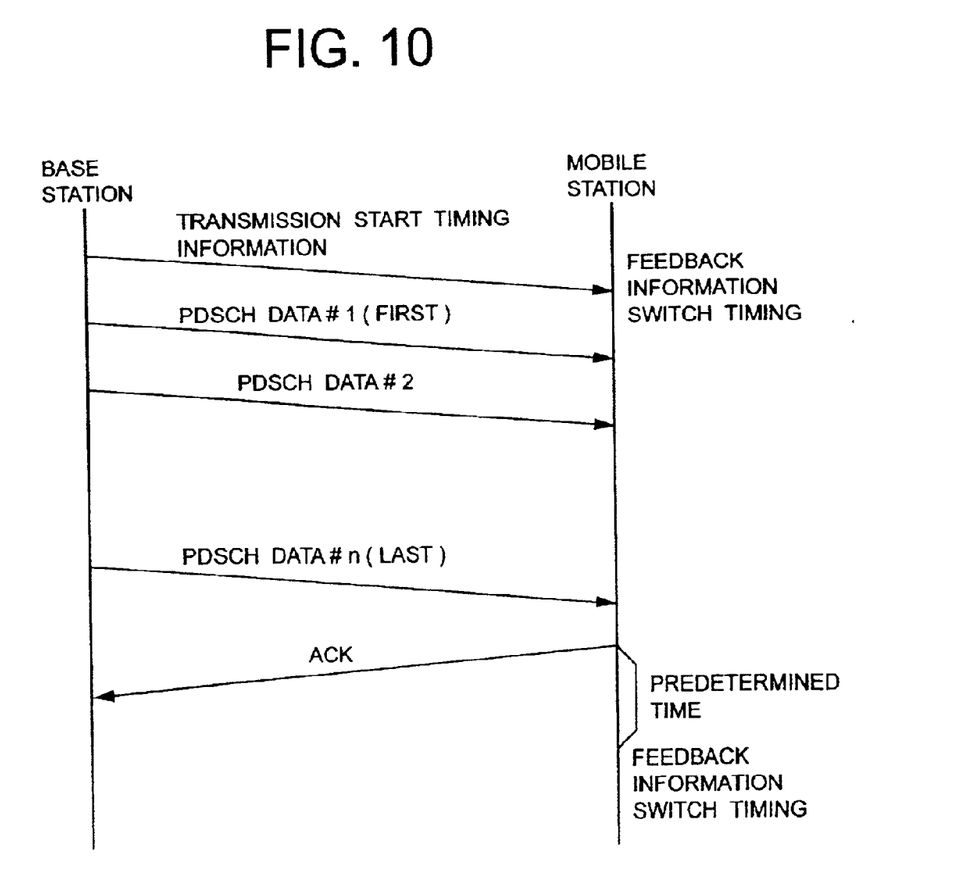
FIG. 10 is a sequence chart showing the operation of the mobile communication system according to a further embodiment of the present invention.
Figure 11:
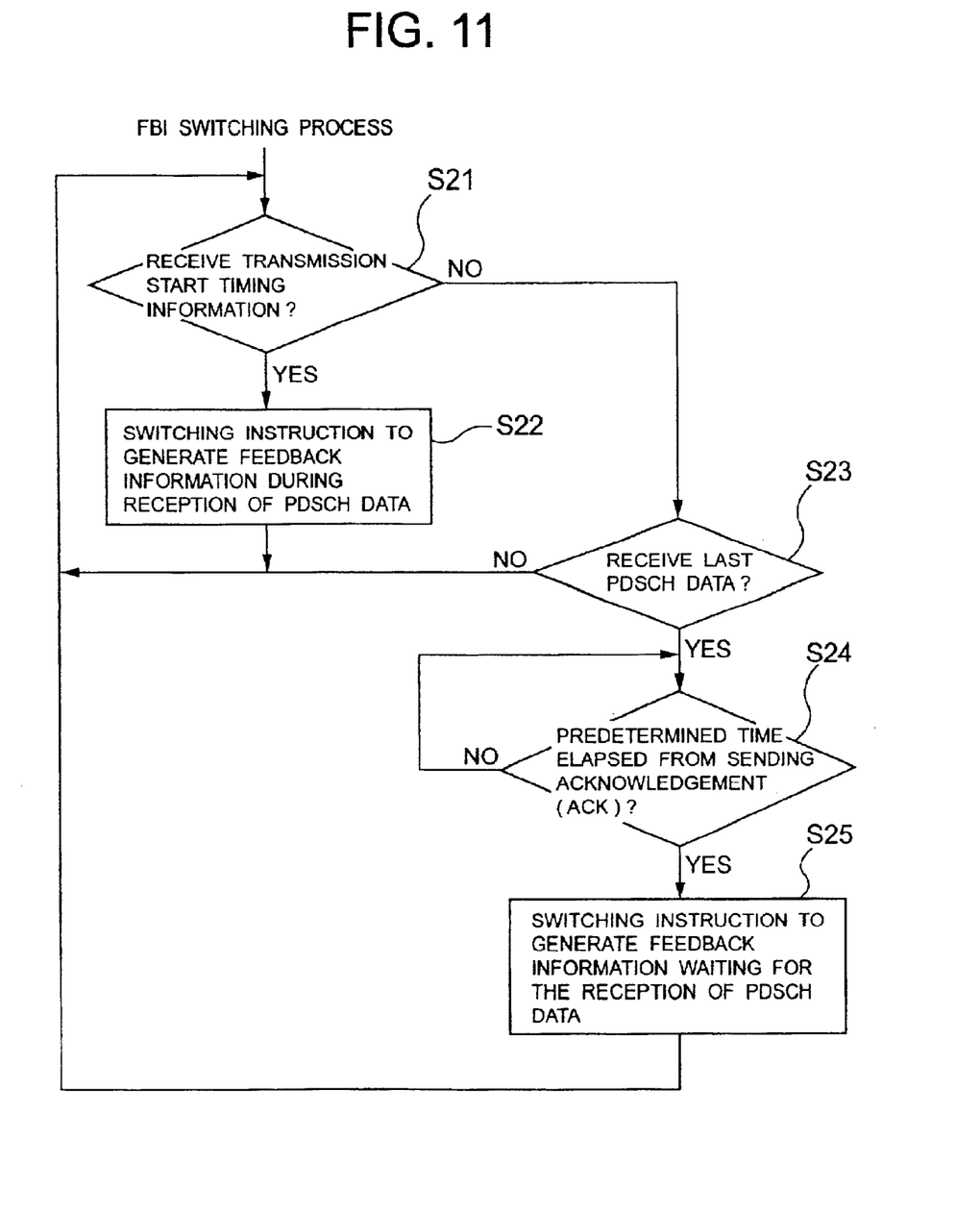
FIG. 11 is a flowchart showing the operation of the mobile station according to the further embodiment of the present invention.

FIG. 10 is a sequence chart showing the operation of the mobile communication system according to a further embodiment of the present invention, and FIG. 11 is a flowchart showing the operation of the mobile station according to the further embodiment of the present invention. As the further embodiment of the present invention has the same configuration of the mobile station as the embodiment shown in FIG. 1, the operation of the mobile communication system according to the further embodiment will be described by referring to FIGS. 1, 10 and 11. The processing operation shown in FIG. 11 is implemented by the control portion 16 executing the program stored in the record medium 19.

Here, while the mobile station 1 and the base stations 2-1 will be described hereafter, it is assumed, in order to simplify the description, that the base stations 2-1 and 2-2 are in the soft handover due to movement of the mobile station 1.

First, in the case of sending the PDSCH data according to the request from the mobile station 1, the base station 2-1 notifies the mobile station 1 of the transmission start timing information by the DPCH #1 (DL) before sending the PDSCH data.

On receiving the transmission start timing information from the base station 2-1 (FIG. 11 step S21), the control portion 16 of the mobile station 1 outputs to the feedback information generating portion 14 the switching instruction to generate the feedback information during the reception of the above-mentioned PDSCH data (FIG. 11 step S22). Hereafter, the control portion 16 shifts to the state of accepting the PDSCH data and sequentially receives the PDSCH data.

The control portion 16 sequentially receives the PDSCH data from the base station 2-1, and receives the last PDSCH data (FIG. 11 step S23) and transmits the acknowledgement (ACK) for the PDSCH data to the base station 2-1, and then if predetermined time elapses (FIG. 11 step S24), it outputs to the feedback information generating portion 14 the switching instruction to generate the feedback information in the state of waiting for the reception of the above-mentioned PDSCH data (FIG. 11 step S25).

Here, as the method for the control portion 16 to identify the last PDSCH data, it may identify it by the information (the flag) given to the last PDSCH data indicating that it is the last one, or it may have the size of the PDSCH data to be sent notified in advance from the base station 2-1 to the mobile station 1 so as to identify it by the size thereof. In addition, it is possible to identify the last PDSCH data by a method other than this.

Thus, while the mobile station 1 notifies the base station 2-1 of the transmission diversity control information, during the reception of the PDSCH data, based on the receiving state of the CPICH #1, transmission efficiency of the DPCH #1 (DL) and DPCH #2 (DL) together does not become the best but that of the PDSCH does because the CPICH #1 has the same propagation path as the PDSCH. At this time, as sending power of the PDSCH is higher than that of the DPCH #1 (DL) and DPCH #2 (DL) together, the entire transmission efficiency (average transmitting power per information bit) of the PDSCH, DPCH #1 (DL) and DPCH #2 (DL) together becomes the best.

On the other hand, while the mobile station 1 notifies the base stations 2-1 and 2-2 of the transmission diversity control information, during standby not receiving the PDSCH data, based on the receiving state after the synthesis of the CPICH #1 and CPICH #2, the transmission efficiency of the DPCH #1 (DL) and DPCH #2 (DL) together becomes the best because the signal wherein the CPICH #1 and CPICH #2 are synthesized has the same propagation path as the signal having the DPCH #1 (DL) and DPCH #2 (DL) together. At this time, as the PDSCH is not transmitted, the entire transmission efficiency of the PDSCH, DPCH #1 (DL) and DPCH #2 (DL) together becomes the best.

Accordingly, the entire transmission efficiency of the PDSCH, DPCH #1 (DL) and DPCH #2 (DL) together becomes the best both during the reception of the PDSCH data and during the standby. In particular, in the system wherein only one mobile station 1 just receiving the PDSCH data exists in the cell and a large number of other mobile stations are on standby waiting for the PDSCH data, it is very effective to switch the above-mentioned methods of determining the transmission diversity control information between during the reception of the PDSCH data and during the standby.

According to the present invention as described above, in the mobile communication system wherein the switching of the base stations by movement to the outside of a radio wave reaching range thereof is performed by the soft handover by the mobile station and, based on the transmission diversity control information fed back from the mobile station, the base station controls the transmission diversity so that the receiving state at the mobile station becomes the best, it determines the transmission diversity control information during reception of the data by the PDSCH during said soft handover based on the receiving state of the signal from the base station sending said PDSCH, and it determines the transmission diversity control information during standby waiting for the reception of the data by the PDSCH during the soft handover based on the receiving state after the synthesis of the signal from each subject base station of the soft handover so that there is the effect of efficiently performing the transmission diversity of the PDSCH and the DPCH without increasing the number of bits of the control information to be fed back to the base station and rendering the feedback period longer.

What is claimed is:

1. A mobile communication system in which a process of switching a base station to accommodate a mobile station to another base station is performed by soft handover and, based on transmission diversity control information fed back from said mobile station, said base station controls said transmission diversity so that a receiving state at said mobile station becomes the best, said system comprising:

a first determination means of, during said soft handover, determining said transmission diversity control information during reception of data by a PDSCH (Physical Downlink Shared Channel) based on the receiving state of a signal from the base station sending said PDSCH; and a second determination means of, during said soft handover, determining said transmission diversity control information during standby waiting for reception of the data by said PDSCH based on the receiving state after synthesis of the signal from each subject base station of said soft handover.

2. The mobile communication system according to claim 1, comprising control means of controlling switching of said first and second determination means according to the receiving state of the data by said PDSCH.

3. The mobile communication system according to claim 2, wherein said control means instructs said first determination means to perform a determination process on receiving the data by a first PDSCH and instructs said second determination means to perform the determination process on receiving the last PDSCH data.

4. The mobile communication system according to claim 3, wherein said control means instructs said first determination means to perform the determination process on the opportunity of transmission start timing information sent from said base station before the data by said first PDSCH is sent to said mobile station.

5. The mobile communication system according to claim 3, wherein said control means instructs said second determination means to perform the determination process on the opportunity of transmission of an acknowledgement from said mobile station to said base station after receiving the data by said last PDSCH.

6. The mobile communication system according to claim 3, wherein said control means instructs said second determination means to perform the determination process after a predetermined time from transmission of an acknowledgement from said mobile station to said base station after receiving the data by said last PDSCH.

7. The mobile communication system according to claim 1, wherein said first determination means determines said transmission diversity control information on said PDSCH, and said second determination means determines said transmission diversity control information on DPCH (Dedicated Physical Channel) that is the signal from each subject base station of said soft handover.

8. The mobile communication system according to claim 1, wherein said first determination means is implemented at the mobile station just receiving the data by said PDSCH, and said second determination means is implemented at a large number of mobile stations in a standby status waiting for reception of the data by said PDSCH.

9. The mobile communication system according to claim 1, wherein either receiving SIR (Signal to Interference Ratio) or Ec/Io (energy per chip/interference wave power per unit frequency) is used as the receiving state of said signal.

10. A mobile terminal of a system in which a process of switching a base station to accommodate the terminal to another base station is performed by soft handover and, based on transmission diversity control information fed back by said base station so that a receiving state at its terminal becomes the best, said transmission diversity is controlled, said mobile terminal comprising:

a first determination function of, during said soft handover, determining said transmission diversity control information during reception of data by a PDSCH (Physical Downlink Shared Channel) based on the receiving state of a signal from the base station sending said PDSCH; and a second determination function of, during said soft handover, determining said transmission diversity control information during standby waiting for reception of the data by said PDSCH based on the receiving state after synthesis of the signal from each subject base station of said soft handover.

11. The mobile terminal according to claim 10, comprising control means of controlling switching of said first and second determination functions according to the receiving state of the data by said PDSCH.

12. The mobile terminal according to claim 11, wherein said control means instructs said first determination function to perform a determination process on receiving the data by a first PDSCH and instructs said second determination function to perform the determination process on receiving the last PDSCH data.

13. The mobile terminal according to claim 12, wherein said control means instructs said first determination function to perform the determination process on the opportunity of transmission start timing information sent from said base station before the data by said first PDSCH is sent to its terminal.

14. The mobile terminal according to claim 12, wherein said control means instructs said second determination function to perform the determination process on the opportunity of transmission of an acknowledgement from its terminal to said base station after receiving the data by said last PDSCH.

15. The mobile terminal according to claim 12, wherein said control means instructs said second determination function to perform the determination process after a predetermined time from transmission of an acknowledgement from its terminal to said base station after receiving the data by said last PDSCH.

16. The mobile terminal according to claim 10, wherein said first determination function determines said transmission diversity control information on said PDSCH, and said second determination function determines said transmission diversity control information on DPCH (Dedicated Physical Channel) that is the signal from each base station of said soft handover.

17. The mobile terminal according to claim 10, wherein either receiving SIR (Signal to Interference Ratio) or Ec/Io (energy per chip/interference wave power per unit frequency) is used as the receiving state of said signal.

18. A transmission diversity application method of a mobile communication system in which a process of switching a base station to accommodate a mobile station to another base station is performed by soft handover and, based on transmission diversity control information fed back from said mobile station, said base station controls said transmission diversity so that a receiving state at said mobile station becomes the best, said method comprising:

a first step of, during said soft handover, giving an instruction to switch to a first determination means of determining said transmission diversity control information during reception of data by a PDSCH (Physical Downlink Shared Channel) based on the receiving state of a signal from the base station sending said PDSCH; and a second step of, during said soft handover, giving an instruction to switch to a second determination means of determining said transmission diversity control information during standby waiting for reception of the data by said PDSCH based on the receiving state after synthesis of the signal from each subject base station of said soft handover.

19. The transmission diversity application method according to claim 18, wherein said first and second steps control switching of said first and second determination means according to the receiving state of the data by said PDSCH.

20. The transmission diversity application method according to claim 19, wherein said first step instructs said first determination means to perform a determination process on receiving the data by a first PDSCH, and said second step instructs said second determination means to perform the determination process on receiving the last PDSCH data.

21. The transmission diversity application method according to claim 20, wherein said first step instructs said first determination means to perform the determination process on the opportunity of transmission start timing information sent from said base station before the data by said first PDSCH is sent to said mobile station.

22. The transmission diversity application method according to claim 20, wherein said second step instructs said second determination means to perform the determination process on the opportunity of transmission of an acknowledgement from said mobile station to said base station after receiving the data by said last PDSCH.

23. The transmission diversity application method according to claim 20, wherein said second step instructs said second determination means to perform the determination process after a predetermined time from transmission of an acknowledgement from said mobile station to said base station after receiving the data by said last PDSCH.

24. The transmission diversity application method according to claim 18, wherein said first determination means determines said transmission diversity control information on said PDSCH, and said second determination means determines said transmission diversity control information on DPCH (Dedicated Physical Channel) that is the signal from each base station of said soft handover.

25. The transmission diversity application method according to claim 18, wherein said first determination means is implemented at the mobile station just receiving the data by said PDSCH, and said second determination means is implemented at a large number of mobile stations in a standby status waiting for reception of the data by said PDSCH.

26. The transmission diversity application method according to claim 18, wherein either receiving SIR (Signal to Interference Ratio) or Ec/Io (energy per chip/interference wave power per unit frequency) is used as the receiving state of said signal.

27. A program of a transmission diversity application method of a mobile communication system in which a process of switching a base station to accommodate a mobile station to another base station is performed by soft handover and, based on transmission diversity control information fed back from said mobile station, said base station controls said transmission diversity so that a receiving state at said mobile station becomes the best, said program intended to have a computer implement the processes of:

during said soft handover, giving an instruction to switch to a first determination means of determining said transmission diversity control information during reception of data by a PDSCH (Physical Downlink Shared Channel) based on the receiving state of a signal from the base station sending said PDSCH; and during said soft handover, giving an instruction to switch to a second determination means of determining said transmission diversity control information during standby waiting for reception of the data by said PDSCH based on the receiving state after synthesis of the signal from each base station of said soft handover.

* * * * *